US010680859B2

(12) United States Patent
Lopez et al.

(10) Patent No.: US 10,680,859 B2
(45) Date of Patent: Jun. 9, 2020

(54) TRANSMITTER AND METHODS THEREIN FOR TRANSMITTING OVERLAID AND UNDERLAID SIGNALS

(71) Applicant: Telefonaktiebolaget LM Ericsson (publ), Stockholm (SE)

(72) Inventors: Miguel Lopez, Solna (SE); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/325,021

(22) PCT Filed: Sep. 22, 2017

(86) PCT No.: PCT/SE2017/050921
§ 371 (c)(1),
(2) Date: Feb. 12, 2019

(87) PCT Pub. No.: WO2018/056892
PCT Pub. Date: Mar. 29, 2018

(65) Prior Publication Data
US 2020/0084071 A1 Mar. 12, 2020

Related U.S. Application Data

(60) Provisional application No. 62/398,140, filed on Sep. 22, 2016.

(51) Int. Cl.
*H04L 27/00* (2006.01)
*H04L 25/03* (2006.01)
(Continued)

(52) U.S. Cl.
CPC ...... *H04L 25/03834* (2013.01); *H04L 1/0003* (2013.01); *H04L 5/0007* (2013.01); *H04L 27/2017* (2013.01); *H04L 27/2626* (2013.01)

(58) Field of Classification Search
CPC ... H04B 1/38; H04B 1/69; H04B 7/06; H04B 7/0639; H04B 15/00; H04J 3/18;
(Continued)

(56) References Cited

U.S. PATENT DOCUMENTS 7,729,433 B2* 6/2010 Jalloul ............. H04B 1/707
375/260
8,503,546 B1* 8/2013 Ashrafi ............. H04L 27/362
370/208

(Continued)

FOREIGN PATENT DOCUMENTS

EP 2903198 A1 8/2015
WO 2016012033 A1 1/2016

OTHER PUBLICATIONS

Stacey, Robert, "Specification Framework for TGax", IEEE 802.11-15/0132r8; IEEE P802.11, Wireless LANs, Sep. 18, 2015, pp. 1-22.

(Continued)

Primary Examiner — Shawkat M Ali
(74) Attorney, Agent, or Firm — Murphy, Bilak & Homiller, PLLC

(57) ABSTRACT

A transmitter 108 and a method therein for transmitting overlaid and underlaid signals to a narrowband receiver 112 and a wideband receiver 110. The transmitter and the receivers operate in a wireless communications network 100. The transmitter generates a narrowband signal carrying data for the narrowband receiver. The narrowband signal is generated by: mapping user code bits of the data to a first set of binary symbols; generating a second set of binary symbols by precoding the first set of binary symbols; rotating the binary symbols of the second set resulting in rotated constellation symbols; and filtering the rotated constellation symbols. Further, the transmitter generates a wideband signal carrying data for the wideband receiver. Furthermore, the (Continued)

transmitter overlays the generated narrowband signal over the generated wideband signal and transmits, to the narrowband receiver and the wideband receiver, the overlaid narrowband signal and the underlaid wideband signal, respectively.

15 Claims, 15 Drawing Sheets

(51) Int. Cl.
*H04L 27/20* (2006.01)
*H04L 1/00* (2006.01)
*H04L 27/26* (2006.01)
*H04L 5/00* (2006.01)

(58) Field of Classification Search
CPC ...... H04J 11/00; H04L 1/0003; H04L 5/0007; H04L 25/03; H04L 25/03834; H04L 27/04; H04L 27/20; H04L 27/26; H04L 27/2017; H04L 27/2629; H04Q 1/00; H04Q 7/20; H04W 28/20

USPC ......... 327/155, 159; 370/208, 330; 375/130, 375/219, 260, 261, 295, 296, 300; 455/87, 318, 434

See application file for complete search history.

(56) References Cited

U.S. PATENT DOCUMENTS

| 8,654,815 | B1* | 2/2014 | Forenza | H04B 7/0626 |
| | | | | 375/141 |
| 10,069,666 | B2* | 9/2018 | Lin | H04L 25/02 |
| 2007/0133387 | A1 | 6/2007 | Arslan et al. | |
| 2009/0041156 | A1 | 2/2009 | Lakkis | |
| 2013/0154703 | A1 | 6/2013 | Jechoux et al. | |

OTHER PUBLICATIONS

Thompson, Steve C., "Constant Envelope OFDM", IEEE Transactions on Communications, vol. 56, No. 8, Aug. 2008, pp. 1300-1312.

* cited by examiner

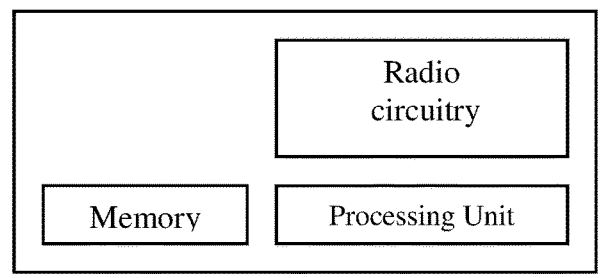
Figure 13 Exemplary wireless node/device or user node acting as transmitter 108
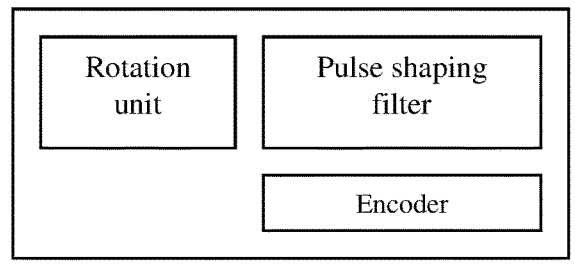
Figure 14 Exemplary processor of the transmitter 108

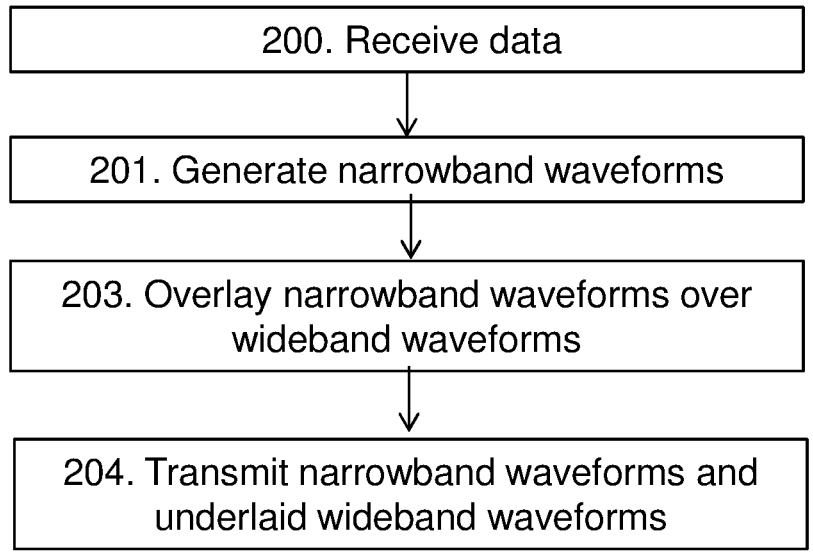
Figure 15A Exemplary flowchart of method in a wireless device/node acting as transmitter 108
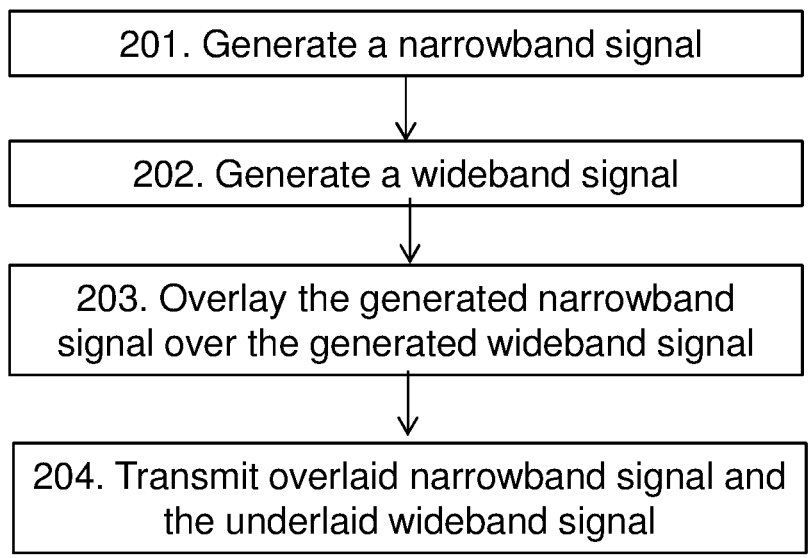
Figure 15B Exemplary flowchart of method in a transmitter 108

US 10,680,859 B2

TRANSMITTER AND METHODS THEREIN FOR TRANSMITTING OVERLAID AND UNDERLAID SIGNALS

TECHNICAL FIELD

Embodiments herein relate to a transmitter and methods therein. Especially, embodiments herein relate to transmission of overlaid and underlaid signals to a narrowband receiver and a wideband receiver, respectively.

BACKGROUND

Internet of Things (IoT) is expected to increase the number of connected devices significantly. A vast majority of these devices will likely operate in unlicensed radio bands, in particular in the 2.4 GHz Industrial, Scientific and Medical (ISM) radio band. At the same time, there is increased demand for using the unlicensed radio bands also for services that traditionally have been supported in licensed radio bands. As an example of the latter, third Generation Partnership Project (3GPP) that traditionally develop specifications only for licensed radio bands have now also developed versions of Long Term Evolution (LTE) which will operate in the 5 GHz unlicensed radio band.

Technologies that are expected to dominate for IoT services are Bluetooth Wireless Technology, in particular Bluetooth Low Energy (BLE), and future versions of the Institute of Electrical and Electronics Engineers (IEEE) 802.11 standard, like the IEEE 802.11ax standard.

The IoT applications are foreseen to most often have rather different requirement and features compared to applications like e.g. file download and video streaming. Specifically, the IoT applications would typically only require low data rate and the amount of data transmitted in a single packet may often only be a few bytes. In addition, the transmissions to and from many devices will occur very seldom, e.g. once an hour or even less often. The number of IoT devices is expected to be huge, which means that although the amount of data to each one of the devices may be small, the aggregated IoT data may still be substantial. Many use cases for IoT applications can be found in an ordinary house, and may be related to various sensors, actuators, etc. The requirements for coverage are therefore substantially less than what usually can be achieved by e.g. a cellular system. On the other hand, the coverage which can be obtained by e.g. the Bluetooth or the IEEE 802.11b/g/n/ac technologies may not suffice. This may be in particular true if one of the devices is outdoors whereas the other device is indoors so that an exterior with rather high penetration loss is in between the devices.

The straight-forward approach to increase the range of a communication link is to reduce the bit rate that is used. Reducing the bit rate by necessity means that it will take longer to transmit a packet of a certain size. As a side effect of this, the channel will be occupied for a longer time. Now, with a large number of devices sharing the same channel, the channel may be congested if this sharing is not done in an effective way. The need for long packets and the increased number of users will make this congestion even more pronounced.

Moreover, the amount of non-IoT data, e.g. data download and video streaming, sent over the same channel may also increase. This implies that to obtain good performance for both the IoT applications and the non-IoT applications, some coordination should preferably take place.

An obvious, and probably the simplest, way to do such coordination is by time sharing between the IoT system and the non-IoT system. However, as the data rate for the IoT system is very low for the individual links, it may likely be hard to obtain good spectrum efficiency in this way. Instead it would be preferable if the two systems, i.e., both the IoT system and the non-IoT system could operate concurrently. One means to achieve this could be if the non-IoT system would be based on Orthogonal Frequency Division Multiplexing (OFDM). Concurrent operation could then be achieved by assigning one or more sub-carriers to the IoT system and the remaining ones to the non-IoT system. The number of sub-carriers allocated to the IoT system could in this way be rather flexible.

Bluetooth and GFSK

Variants of Frequency Shift Keying (FSK) are used in e.g. Bluetooth Wireless Technology. The FSK is a frequency modulation wherein digital information is transmitted through discrete frequency changes of a carrier signal. The Bluetooth technology employs Gaussian Frequency Shift Keying (GFSK). The GFSK is a constant envelope modulation which allows cost efficient implementations. At the receiver side, a simple limiting receiver may be used, i.e., the Analog-to-Digital Converter (ADC) may be replaced by a simple comparator and there will essentially be no need for an Automatic Gain Control (AGC) in the receiver, further simplifying the implementation and reducing the cost. Even more significant is the gain at the transmitter side. Due to that the GFSK is a constant envelope modulation, there is less need to back-off the Power Amplifier (PA) and there are much less linearity requirements on the PA, and thereby significantly higher power efficiency can be obtained. The OFDM is known to suffer severely from a high Peak-to-Average-Ratio (PAR), which means a less efficient transmission than FSK. Since an IoT device, such a sensor, may be powered by a coin battery, the power efficiency of the device is one of the key features.

OFDM

A block diagram for an OFDM transmitter is shown in FIG. 1. First the information is processed by an Inverse Fast Fourier Transform (IFFT), which effectively transforms the signal from the frequency domain to the time domain. After that a Cyclic Prefix (CP) is added. Then, the signal is passed through a Digital-to-Analog Converter (DAC), after which it is up-converted in frequency to the carrier frequency. This up-conversion is what in FIG. 1 is referred to as the mixer. Finally, the signal is amplified by means of the PA before it is transmitted.

Non-Orthogonal Multiple Access Via Overlay/Underlay

It is apparent from the discussion above that concurrent operation of narrowband (NB) and wideband (WB) stations, e.g. NB and WB devices, may be advantageous in wireless networks supporting both IoT applications and high data rate applications. Due to the power efficiency and cost, it is desirable to allow NB devices supporting GFSK. This can be achieved by introducing a non-orthogonal multiple access technique which we shall name overlay/underlay. FIG. 2 schematically illustrates a transmitter implementing the overlay/underlay technique. It is seen how a GFSK signal can be added to an OFDM signal prior to performing the DAC, up-conversion by means of the mixer, and signal amplification by means of the PA. Frequency domain multiplexing of OFDM signals intended to WB STA's and NB GFSK signals intended for NB STA's can be achieved by simply not transmitting, i.e. blanking, the WB signals on some of the sub-carriers, i.e., effectively setting the corresponding frequency bins to zero in the IFFT, as illustrated in FIG. 2. This will result in a "gap" in the spectrum. This gap can be placed where desired by simply setting the corresponding sub-carriers to zero. The NB signal can then be assigned to the nulled OFDM sub-carriers. The NB GFSK signal can then be added to the WB OFDM signal, by placing it in the above mentioned generated gap. One means to achieve this is to generate the NB GFSK signal at baseband, and then just shift it in frequency so that it fits in the gap.

Although some of the sub-carriers are not used by the high data rate signal, it does not mean that placing a low-rate signal in the gap will ensure that the signals do not interfere with one another, i.e., they will not necessarily be perfectly orthogonal. We say that the NB signal(s) is overlaid over the WB signal(s), and called the NB signal an overlaid signal and the WB signal an underlaid signal. This non-orthogonal multiple access scheme is named overlay/underlay. Even though it has been described only with one overlaid signal, it is straightforward to generalize it to two or more overlaid signals.

Although overlaying GFSK signals over an underlaid OFDM/OFDMA signal may give acceptable results, link performance is not so good.

SUMMARY

Therefore, an object of some embodiments disclosed herein is to improve the link performance in an overlay/underlay non-orthogonal multiple access system.

According to an aspect of embodiments herein, the object is achieved by a method performed by a transmitter, e.g. a wireless transmitter, for transmitting overlaid and underlaid signals to a narrowband receiver and a wideband receiver. The transmitter, the narrowband and wideband receivers operate in a wireless communications network. The transmitter generates a narrowband signal which carries data for transmission to the narrowband receiver. The transmitter generates the narrowband signal by: mapping user code bits of the data to a first set of binary symbols; generating a second set of binary symbols by precoding the first set of binary symbols; rotating the binary symbols of the second set by 90 degrees resulting in rotated constellation symbols; and filtering the rotated constellation symbols by means of a pulse shaping filter. Further, the transmitter generates a wideband signal, which carries data for transmission to the wideband receiver. Furthermore, the transmitter overlays the generated narrowband signal over the generated wideband signal, wherein the generated narrowband signal is referred to as an overlaid narrowband signal and the generated wideband signal is referred to as an underlaid wideband signal. Yet further, the transmitter transmits, to the narrowband receiver and the wideband receiver, the overlaid narrowband signal and the underlaid wideband signal, respectively.

According to an aspect of embodiments herein, the object is achieved by a wireless transmitter for transmitting overlaid and underlaid signals to a narrowband receiver and a wideband receiver. The transmitter, the narrowband and wideband receivers are configured to operate in a wireless communications network. The transmitter is configured to generate a narrowband signal which carries data for transmission to the narrowband receiver. The transmitter is configured to generate the narrowband signal by: mapping user code bits of the data to a first set of binary symbols; generating a second set of binary symbols by precoding the first set of binary symbols; rotating the binary symbols of the second set by 90 degrees resulting in rotated constellation symbols; and filtering the rotated constellation symbols by means of a pulse shaping filter. Further, the transmitter is configured to generate a wideband signal, which carries data for transmission to the wideband receiver. Furthermore, the transmitter is configured to overlay the generated narrowband signal over the generated wideband signal, wherein the generated narrowband signal is referred to as an overlaid narrowband signal and the generated wideband signal is referred to as an underlaid wideband signal. Yet further, the transmitter is configured to transmit, to the narrowband receiver and the wideband receiver, the overlaid narrowband signal and the underlaid wideband signal, respectively.

According to another aspect of embodiments herein, the object is achieved by a computer program, comprising instructions which, when executed on at least one processor, causes the at least one processor to carry out the method performed by the transmitter.

According to another aspect of embodiments herein, the object is achieved by a carrier comprising the computer program, wherein the carrier is one of an electronic signal, an optical signal, a radio signal or a computer readable storage medium.

Since the transmitter generates the narrowband signal by mapping user code bits of the data to a first set of binary symbols; by generating a second set of binary symbols by precoding the first set of binary symbols; by rotating the binary symbols of the second set by 90 degrees resulting in rotated constellation symbols; and by filtering the rotated constellation symbols by means of a pulse shaping filter, the spectrum of the overlaid narrowband signal may by tuned so that the interference caused to a wideband receiver is less than the interference caused by a GFSK signal. This results in an improved link performance in the wireless communications network.

An advantage with embodiments herein is that they allow concurrent operation of the narrowband receiver and the wideband receiver in the same wireless communications network.

A further advantage with embodiments herein is that the opening of an eye diagram of the narrowband signal is larger than the opening of the eye diagram of a GFSK signal, resulting better performance for the narrowband receiver.

BRIEF DESCRIPTION OF DRAWINGS

Examples of embodiments herein will be described in more detail with reference to attached drawings in which:

FIG. 13 is a schematic block diagram illustrating embodiments of a wireless node/device or user node acting as a transmitter;

FIG. 14 is a schematic block diagram illustrating embodiments of an exemplary processor of a transmitter;

FIG. 15A is flowchart depicting embodiments of a method performed by a wireless node/device acting as a transmitter;

FIG. 15B is flowchart depicting embodiments of a method performed by a transmitter;

DETAILED DESCRIPTION

As part of developing embodiments herein, some drawbacks with the state of the art communications networks will first be identified and discussed.

Eye Diagram

An eye diagram provides a graphical way to assess the quality of signals. Signal analyzers often provide functionality to compute and display the eye diagram. Some embodiments disclosed herein relate to complex-valued baseband waveforms that are circularly symmetric. That is, the statistical characteristics of the signal are unchanged if the coordinate axis are rotated around the origin. It should be understood that in this disclosure, the terms "waveform", and "signal" are used inter-changeably.

Suppose that x(t), $0 \leq t \leq T_x$ is a circularly symmetric baseband signal, which, without any loss of generality, is assumed to have a duration $T_x$. We define the eye diagram as the set of trajectories obtained by successive shifts of the real (or in-phase) component of x, of a given duration T:

$$\text{eye}(T)=\{\Re e\{x(t-kT)\}\cdot\text{rect}_T(t-kT):\ 0\leq t<T, k\in Idx\},$$

where $\text{rect}_T(t)$ denotes a rectangular pulse of duration T $$\text{rect}_T(t) = \begin{cases} 1, & 0 \leq t < T \\ 0 & \text{otherwise} \end{cases},$$

and Idx is the set of integers such that x(t−kT) is well defined. In other words, each element y in eye(T) is a real-valued trajectory or curve of duration T. A similar definition can be done for the imaginary part (i.e. the quadrature component), but it is not necessary since we are assuming circular symmetry. When the curves or trajectories belonging to the set eye(T) are plotted together in one graph, a diagram resembling an eye is displayed, hence the name eye diagram.

Figure 3:
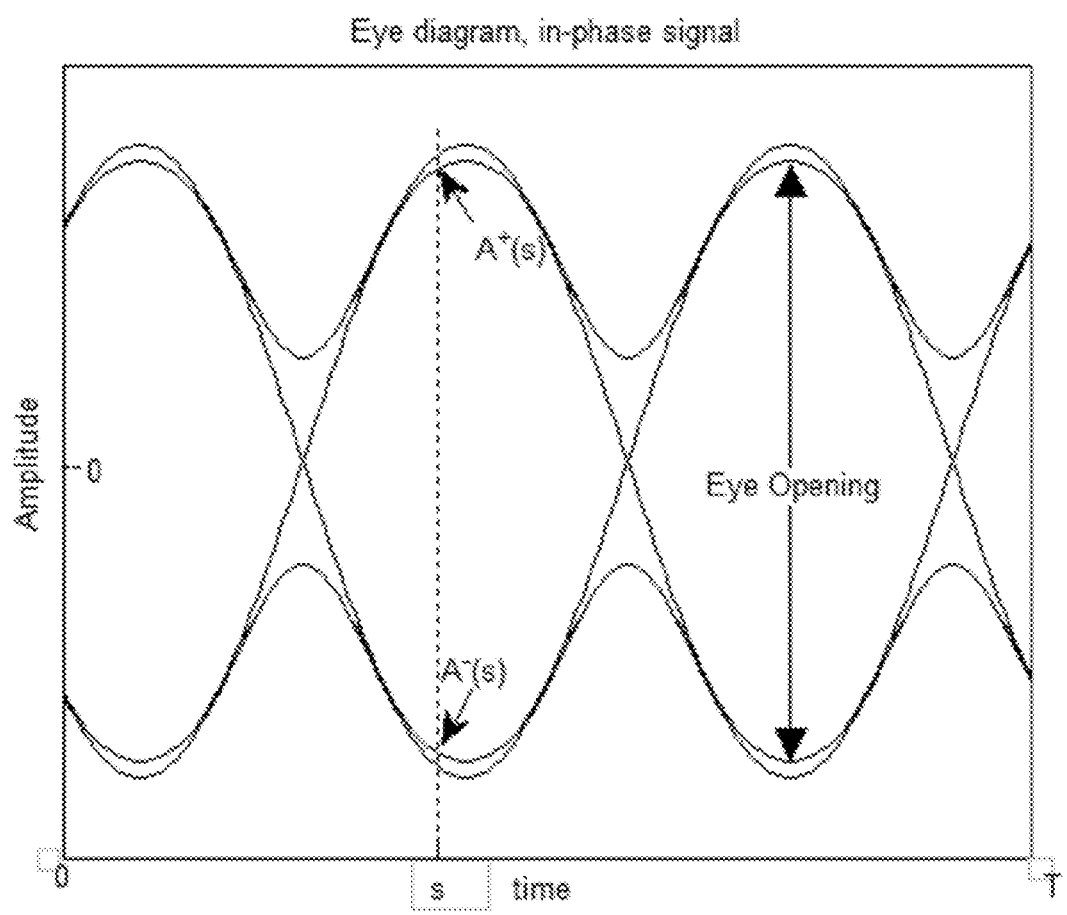
FIG. 3 schematically illustrates how the eye opening is defined.

Informally, the eye opening is defined as the maximum vertical opening of the eye in the diagram, as illustrated in FIG. 3. Formally, it can be defined as follows. For 0≤s<T, define $$A^+(s)=\min\{y(s):y\in\text{eye}(T),y(s)>0\},$$

$$A^-(s)=\min\{y(s):y\in\text{eye}(T),y(s)<0\}.$$

Then $A^+(s)-A^-(s)$ is the aperture at time s. The eye opening is given by $$\text{EyeOpening}=\max\{A^+(s)-A^-(s):0\leq s<T\}.$$

The definition is illustrated in FIG. 3.

It is worth noting that inter-symbol interference causes closing of the eye opening. This closing may be minor as illustrated in the FIG. 3, but it can also be so severe that the eye in completely closed. Although overlaying GFSK signals over an underlaid OFDM/OFDMA signal may give acceptable results, improvements in link performance are desirable. Embodiments disclosed herein provide means to improve the link performance in an overlay/underlay non-orthogonal multiple access system. Both the underlaid and overlaid users benefit from the performance improvements.

Therefore, as mentioned above, according to embodiments herein, a way of improving the link performance in the wireless communications network is provided.

Figure 1:
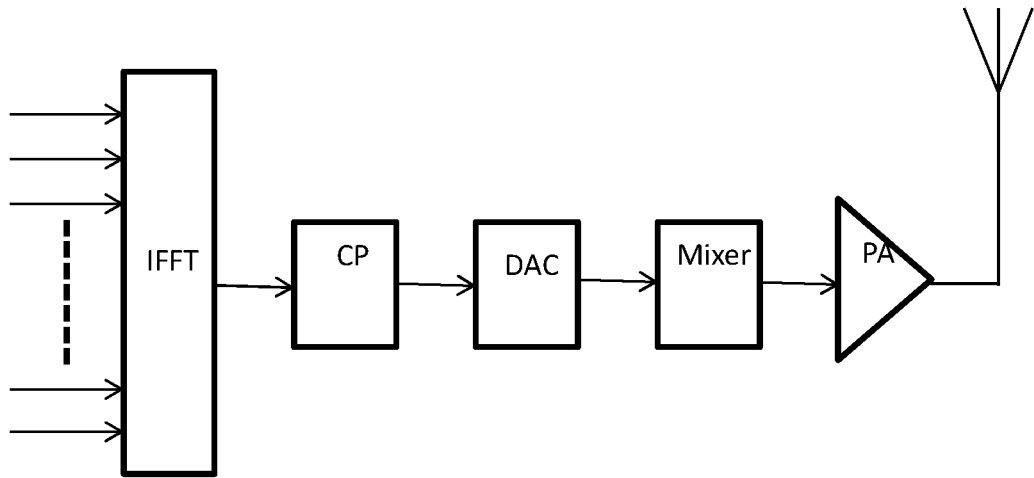
FIG. 1 schematically illustrates a block diagram for an OFDM transmitter according to prior art.

With reference to FIG. 1 previously described, embodiments disclosed herein relate to the digital part, e.g. to parts of the block diagram preceding the DAC, whereas the DAC and the analog parts, such as the up-conversion by means of the mixer and the signal amplification by means of the PA, are unaffected.

In the following section, embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

The overlay/underlay multiple access technique is a non-orthogonal multiple access technique and may be advantageously applied to allow the concurrent operation of NB radio nodes and WB radio nodes in the same wireless system. The case where the WB signals are generated using OFDM, and the NB signals are generated using GFSK is of particular relevance. The reason is that OFDM is widely used in wireless systems based on the IEEE 802.11 and the LTE standards, while GFSK is used in wireless systems such as e.g. the Bluetooth standard.

Some embodiments disclose a modification of the overlay/underlay technique based on WB OFDM and NB GFSK waveforms. Specifically, it is proposed to introduce an overlay/underlay multiple access technique, where the underlaid WB signals are generated using the OFDM, and the overlaid NB signals are generated using a novel modulation technique, which we call NO-GFSK. The acronym NO-GFSK stands for Nearly Orthogonal GFSK. This technique produces waveforms similar to those generated by a GFSK modulator, but takes advantage of some additional degrees of freedom provided by the fact that the NB signal is overlaid over a WB OFDM signal. The GFSK is well known to generate signals with a compact spectrum. However, if the NB signal is overlaid over a WB OFDM signal, it is possible to widen the spectrum of the NB signal without degrading the performance of the underlaid WB OFDM signal. For example, the energy of the NB signal may be spread in a manner that is nearly orthogonal to the OFDM signal. Hence, carefully controlled spectrum widening of the NB signal can yield improved link performance for both the NB and WB receivers. In other words, the WB signal experiences less interference from the NB signal, while at the same time the NB signal exhibits less inter-symbol interference, i.e. a kind of self-interference inherent in GFSK. Moreover, the novel modulation, i.e. the NO-GFSK, is completely transparent, to the NB GFSK receivers. No change whatsoever is required at the receiver side, so that a chipset supporting the GFSK, e.g. Bluetooth Low Energy or Bluetooth Long Range, can be used at the receiver side.

Embodiments disclosed herein provide a means to increase the link performance for both the WB and the NB STA's in a wireless communications system based in overlay/underlay non-orthogonal multiple access, and supporting the OFDM for WB transmissions and the GFSK for NB transmissions. The methods disclosed in some embodiments herein may be implemented, e.g. entirely implemented, in a wireless transmitter, typically an AP or base station, which often has more processing capabilities and fewer energy constraints than a non-AP STA, such as a wireless device, or a UE. Moreover, the proposed technique is completely transparent at the receiver side. It does not require any hardware upgrades or new receiver algorithms.

Figure 4:
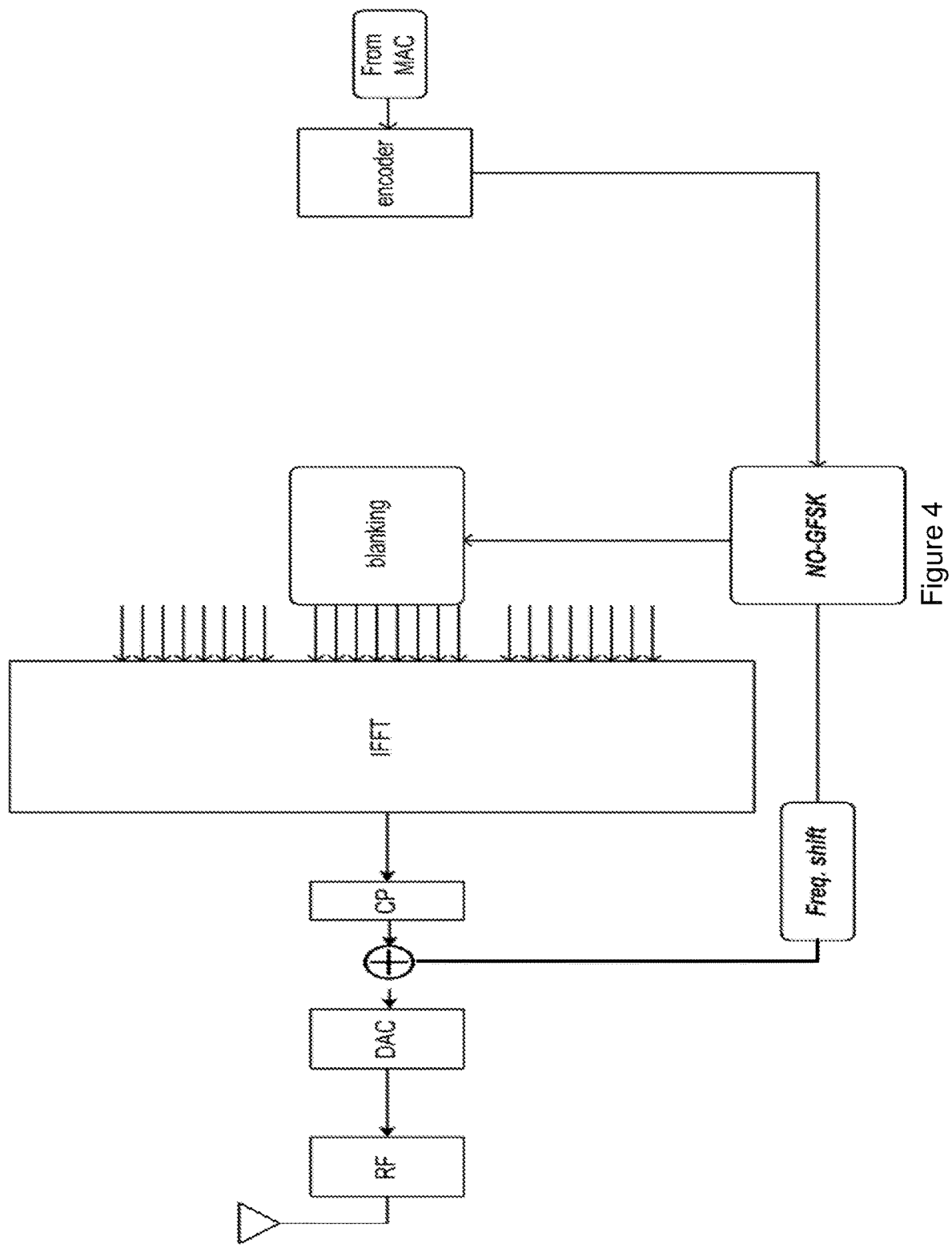
FIG. 4 schematically illustrates a block diagram of embodiments of a transmitter.
Figure 5:
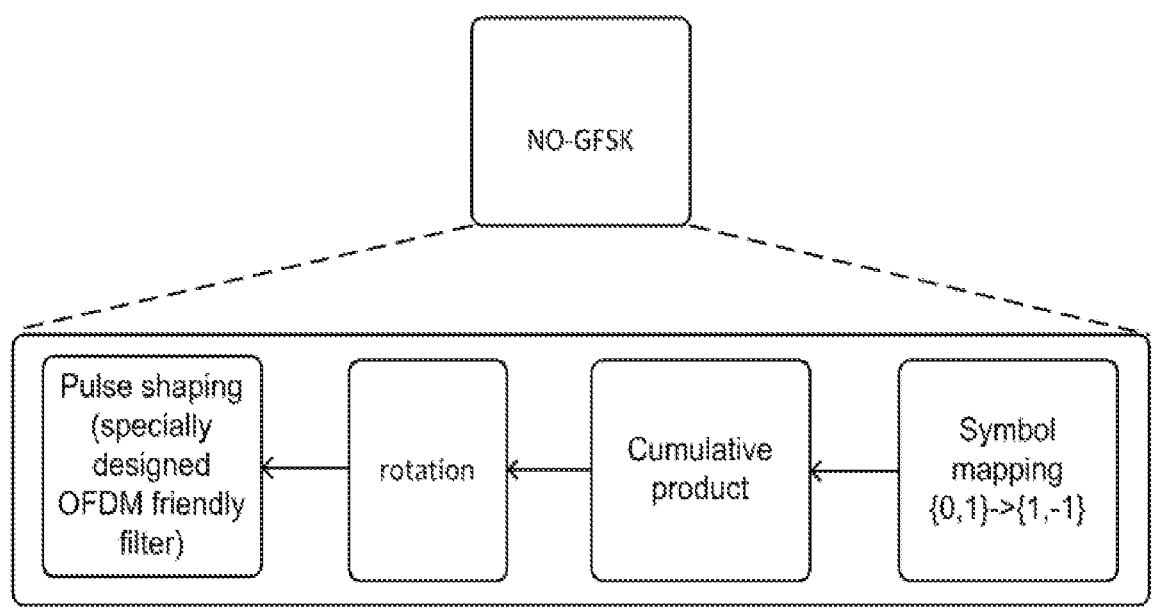
FIG. 5 schematically illustrates a block diagram of a NO-GFSK module comprised in embodiments of a transmitter.

Embodiments disclosed herein are illustrated in the block diagrams of FIG. 4 and FIG. 5.

Figure 2:
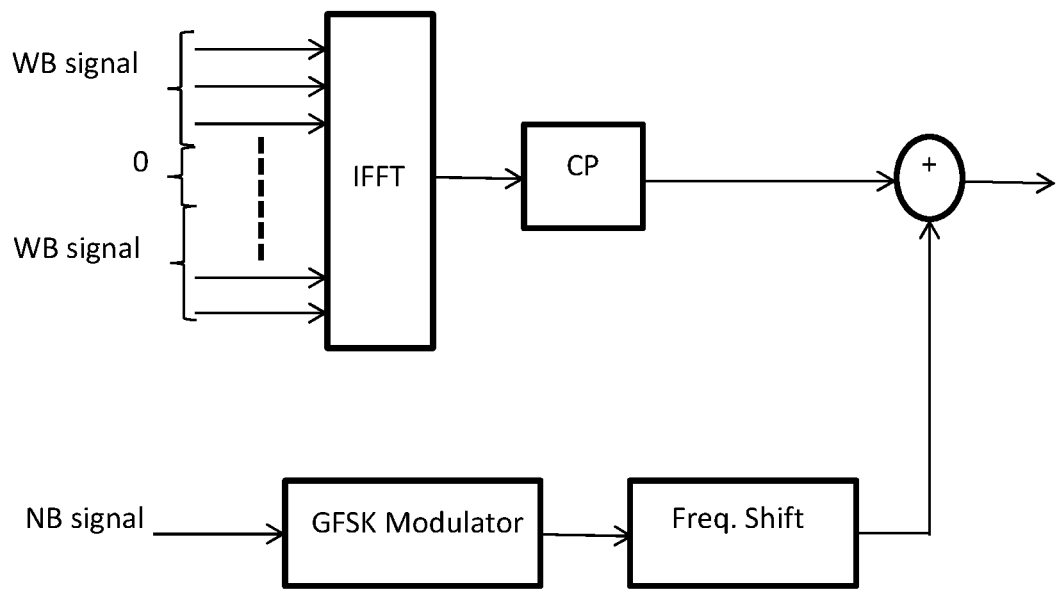
FIG. 2 schematically illustrates a block diagram for an OFDM transmitter and a GFSK transmitter implementing the overlay/underlay technique according to prior art.

FIG. 4 shows how to modify the transmitter shown in FIG. 2 in order to implement the overlay/underlay multiple access scheme with the novel NO-GFSK modulation. FIG. 4 schematically illustrates a block diagram of a transmitter, e.g. an AP transmitter, such as a transmitter 108 which will be described in more detail below, illustrating how to implement an overlay/underlay multiplexing. The box labeled NO-GFSK implements a novel modulator as shown in FIG. 5. The non-blanked subcarriers are active and comprised in the wideband (WB) underlaid signal. FIG. 5 illustrates how NO-GFSK modulation works. The sub-carriers allocated to the underlaid user, e.g. a WB receiver 110 which will be described in more detail below, are blanked (i.e. nulled.) Regarding sub-carriers allocated to the NB overlaid user, e.g. a NB receiver 112 which will be described in more detail below. First, the user code bits are mapped to binary symbols. Then the symbols are precoded by means of a cumulative product (in the Matlab language this corresponds to the command cumprod.) It is well known in the art that there is a one-to-one correspondence between bits and binary symbols, and that precoding may be applied to either the bits or the binary symbols, while generating the same modulated signal. In some embodiments disclosed herein precoding is applied to binary symbols, but it is understood that there are alternative embodiments using precoding of the bits. The cumulative product introduces memory. Note that if binary symbols $\{+1, -1\}$ are the input to the cumulative product, the output also consists of binary symbols $\{+1, -1\}$. The next step is to rotate the new symbols by 90 degrees. This results in 4 possible phases for the signal. Finally, the rotated constellation symbols are filtered through a pulse shaping filter. This filter is specially designed to create less interference to the underlaid users than a GFSK signal, while increasing the opening of the eye diagram with respect to a GFSK signal with the same power and baud rate. The NO-GFSK signal thus constructed is overlaid over a wideband OFDM signal and transmitted. A receiver, e.g. the NB receiver 112, configured to receive GFSK signals with the same baud rate as the NO-GFSK signal will be able to receive the NO-GFSK signal and will experience better link performance than it would have experienced if a GFSK signal had been overlaid. Further, a WB receiver, e.g. the WB receiver 110, will be able to receive the wideband OFDM signal.

Figure 6:
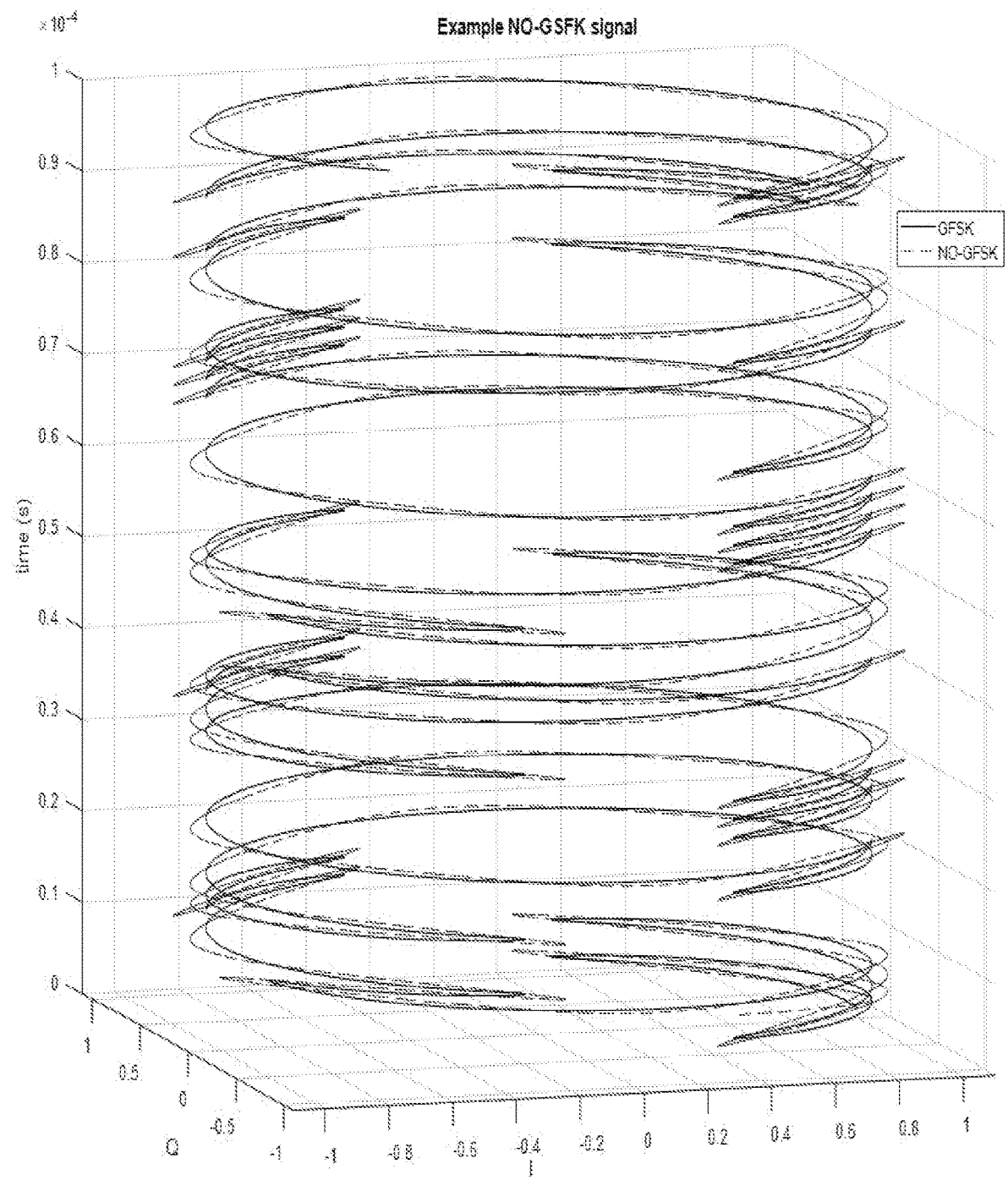
FIG. 6 schematically illustrates trajectories of the GFSK and the NO-GFSK in the signal plane.

FIG. 6 depicts the trajectories of the GFSK and the NO-GFSK signals in the signal space. The horizontal axes correspond to the In-Phase (I) and Quadrature (Q) components, while time is displayed vertically. It can be observed that the trajectory followed by the NO-GFSK signal closely resembles the trajectory followed by the GFSK signal.

Figure 7:
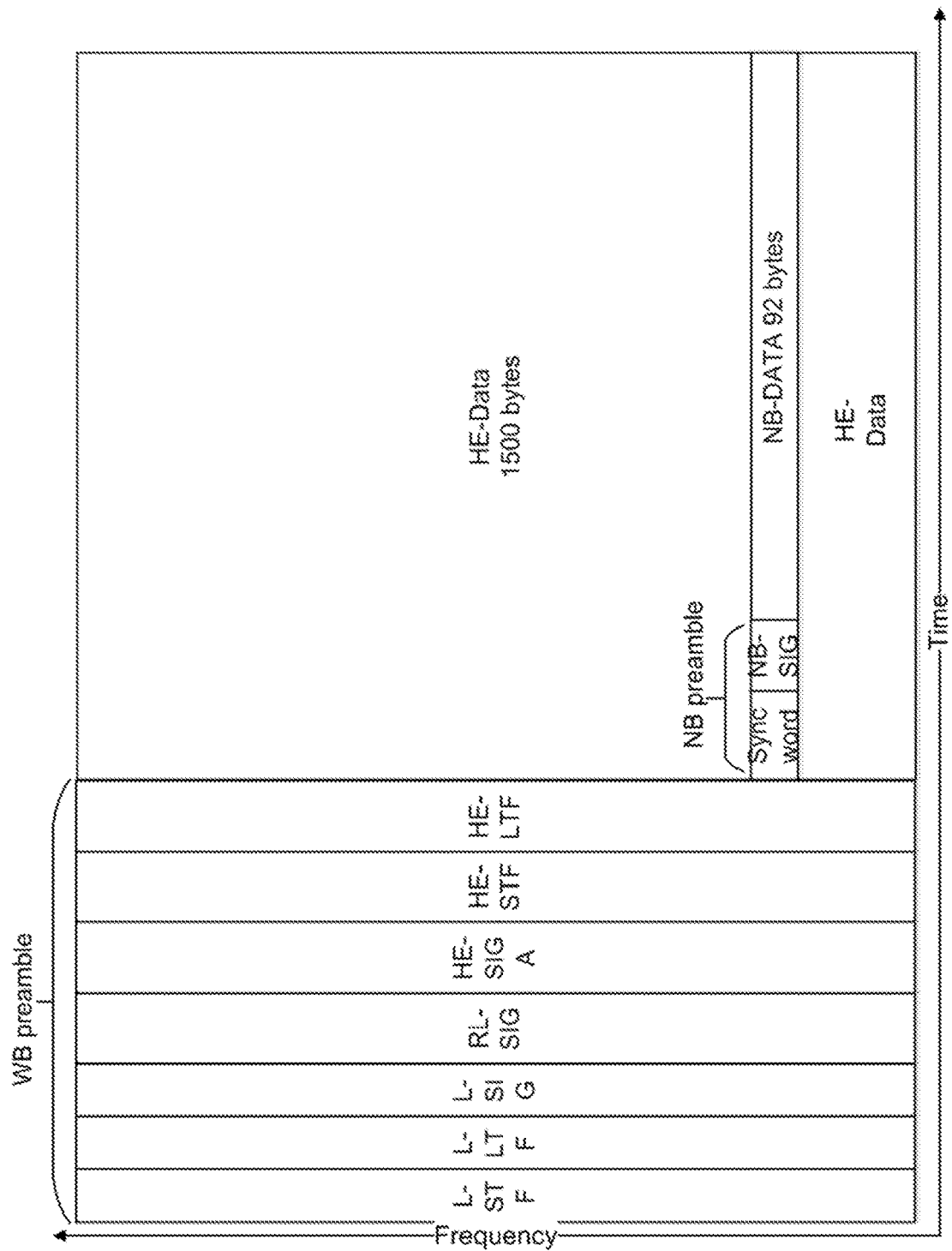
FIG. 7 schematically illustrates the overlay/underlay of packets in the time frequency plane.

FIG. 7 schematically illustrates overlay/underlay according to some embodiments disclosed herein. This figure shows packets in the time frequency plane. The underlaid signal comprising a WB preamble and High Efficiency (HE) data has been modulated according to the IEEE 802.11 ax amendment to the IEEE 802.11 standard. The overlaid signal comprises a NB preamble and NB-Data. Thus, FIG. 7 shows an example of a packet transmitted by an AP, e.g. the transmitter 108, according to some embodiments disclosed herein. In this case the wideband signal has been modulated according to the IEEE 802.11ax standard, while the narrowband signal has been generated by means of the NO-GFSK.

Figure 8:
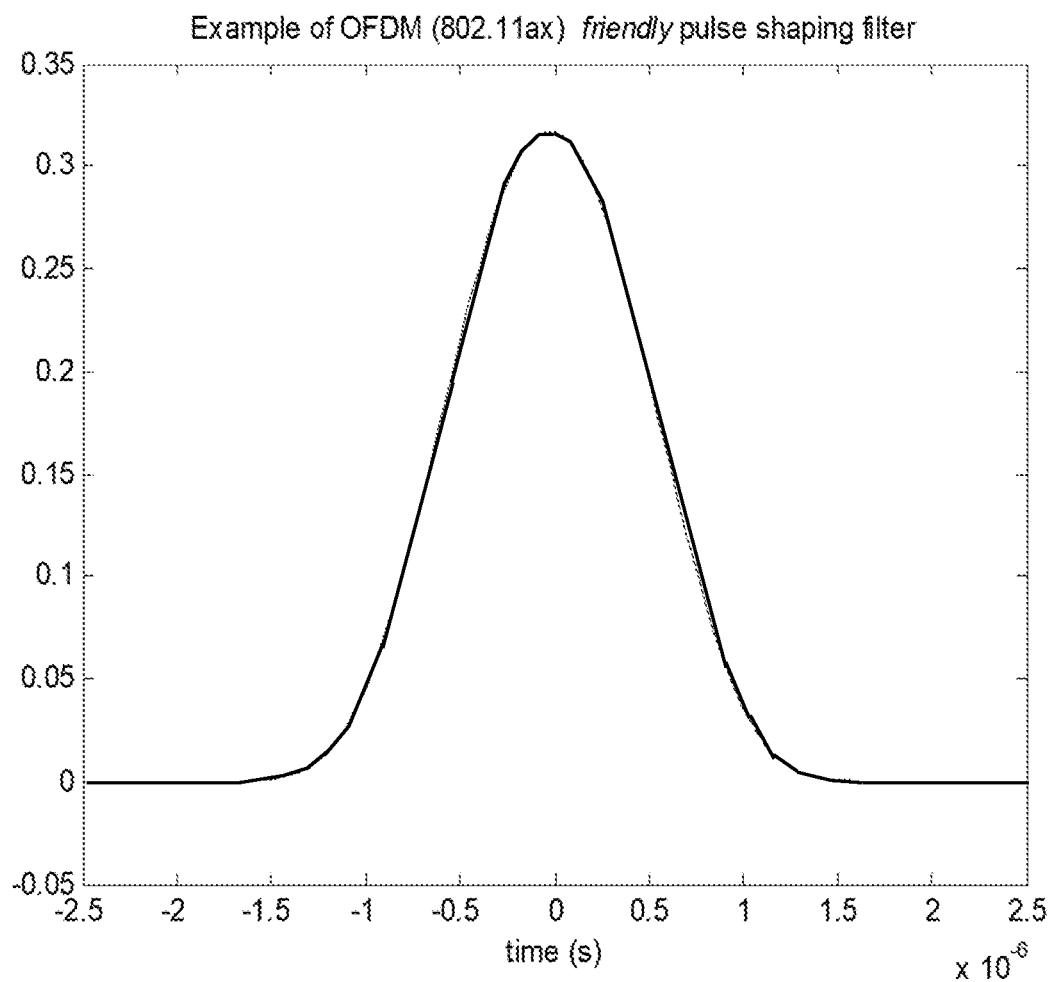
FIG. 8 schematically illustrates an example of a pulse shaping filter designed to overlay NO-GFSK over IEEE 802.11ax OFDM signals.

The benefits brought about by some embodiments disclosed herein depend to a large extent on the design of the pulse shaping filter for the NO-GFSK. An example of a Finite Impulse Response (FIR) filter, in the time domain, is shown in FIG. 8. In other words, FIG. 8 schematically illustrates an example of a pulse shaping filter designed to overlay the NO-GFSK signal over the IEEE 802.11ax OFDM signal.

Figure 9:
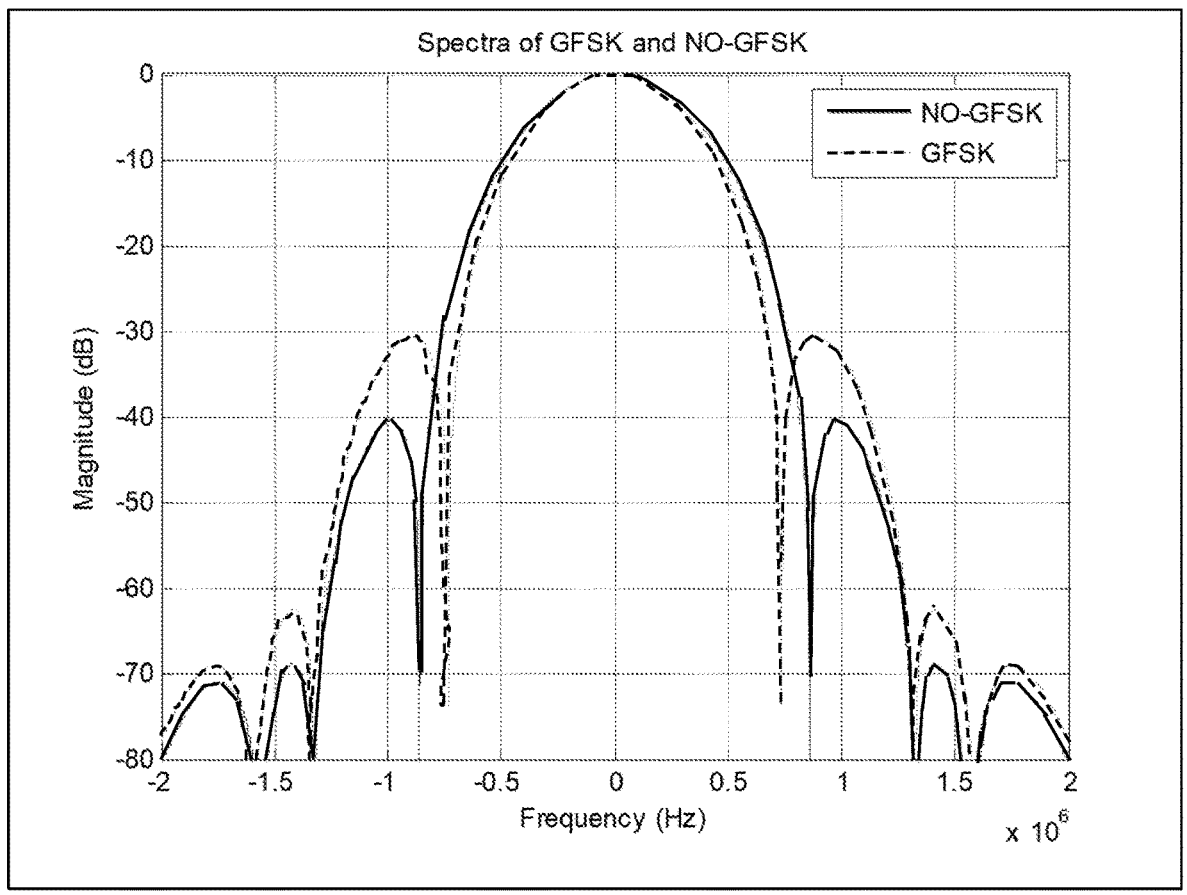
FIG. 9 schematically illustrates a comparison of the spectra of the GFSK (as used in Bluetooth low energy) and NO-GFSK, both having the same baud rate.

The spectral characteristics of this pulse are shown in FIG. 9, where the spectra of the GFSK signal (as used in Bluetooth Low Energy) and the NO-GFSK signal, both having the same baud rate, are compared. It can be seen that the NO-GFSK signal is spectrally wider than the GFSK signal for frequencies less than 700 kHz from the center of frequency. However, the NO-GFSK spectrum decays faster than the GFSK spectrum for frequencies farther away from the center frequency.

Figure 10:
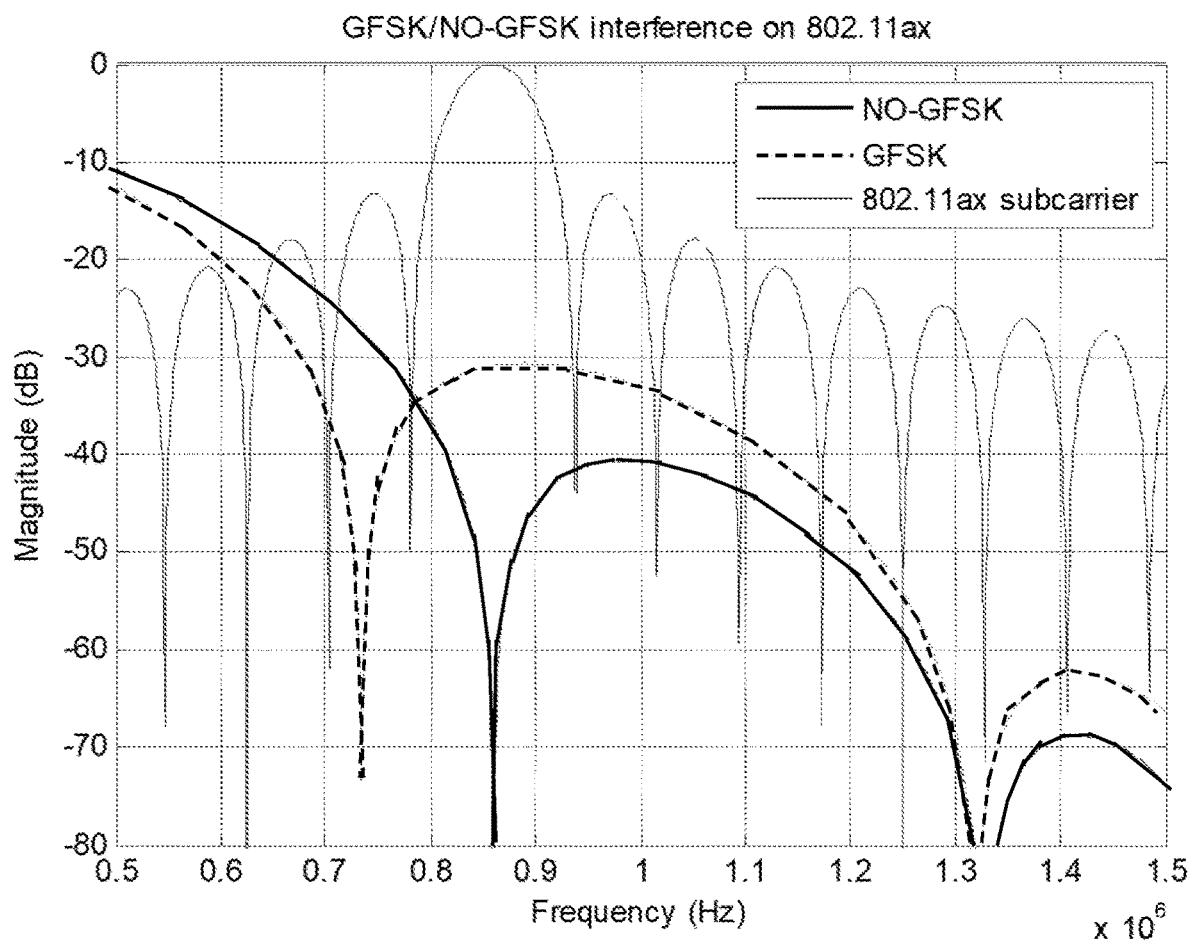
FIG. 10 schematically illustrates spectra of the GFSK, the NO-GFSK and a IEEE 802.11ax sub-carrier.

FIG. 10 schematically illustrates spectra of GFSK, NO-GFSK and one 802.11ax sub-carrier. This is a zoom of a part of the previous figure, and the spectrum of the 802.11ax subcarrier is also shown. FIG. 10 shows also that the NO-GFSK signal is partially orthogonal to the one IEEE 802.11 ax OFDM subcarrier. It can be seen that the NO-GFSK signal has a zero at the center of frequency of the OFDM subcarrier. In other words, the NO-GFSK signal is partially orthogonal to the OFDM signal. It can also be observed that the GFSK introduces more interference than the NO-GFSK to subcarriers located more than 900 kHz away from the center of frequency of the overlaid NB signal, i.e. the GFSK or the NO-GFSK. The spectral decay of the NO-GFSK may be tuned to ensure that the active subcarriers of the underlaid WB signal will have a sufficiently high SNR. Hence, this decay may depend on the Modulation and Coding Scheme (MCS) employed by the WB signal.

Figure 11:
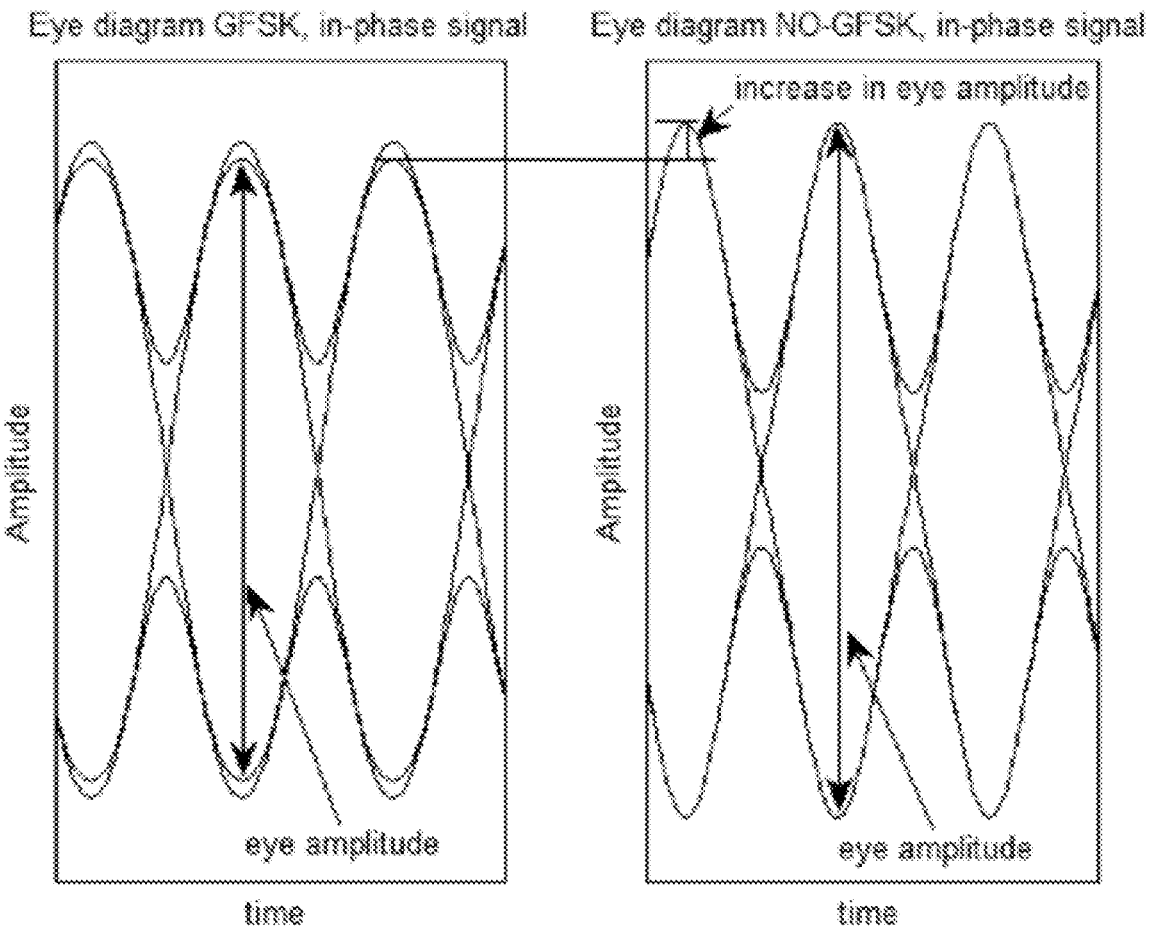
FIG. 11 schematically illustrates eye diagrams for the GFSK and the NO-GFSK.

The eye diagrams of the generated GFSK and NO-GFSK signals having the same baud rate, are shown in FIG. 11. It can be seen that the eye opening of the NO-GFSK signal is considerably larger, i.e. wider, than the eye opening of the GFSK signal, and hence it generates less inter-symbol interference. This explains why the NO-GFSK gives significant performance improvements when compared to the GFSK.

Figure 12:
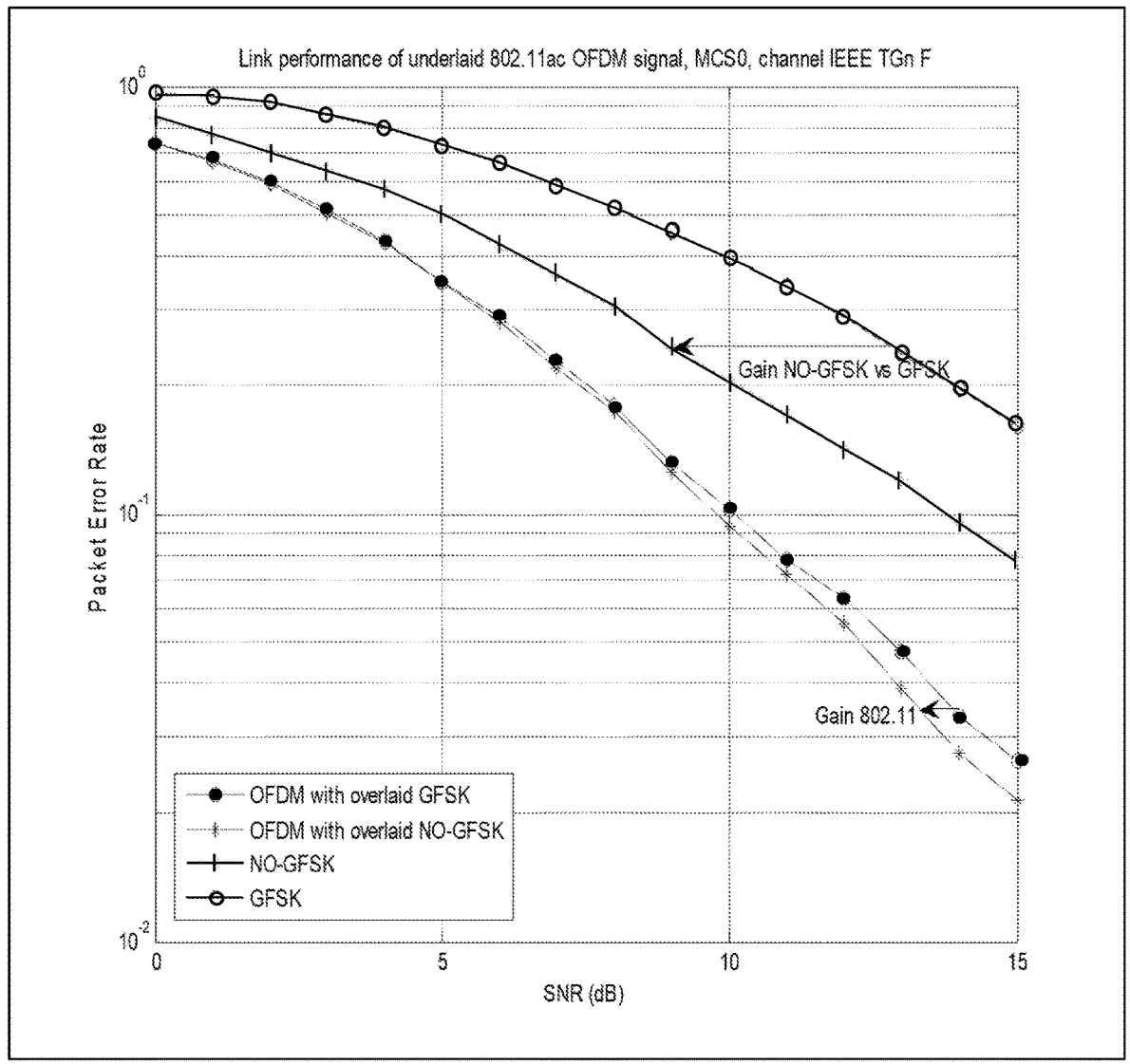
FIG. 12 schematically illustrates example of performance of GFSK and NO-GFSK overlaid over a wideband OFDM signal.

The link performance of the GFSK and the NO-GFSK overlaid over a wideband OFDM signal, is illustrated in FIG. 12. It can be seen that the use of the NO-GFSK results in significant link performance gains for both the overlaid and the underlaid signals in that both the packet error rates are reduced.

Figure 16:
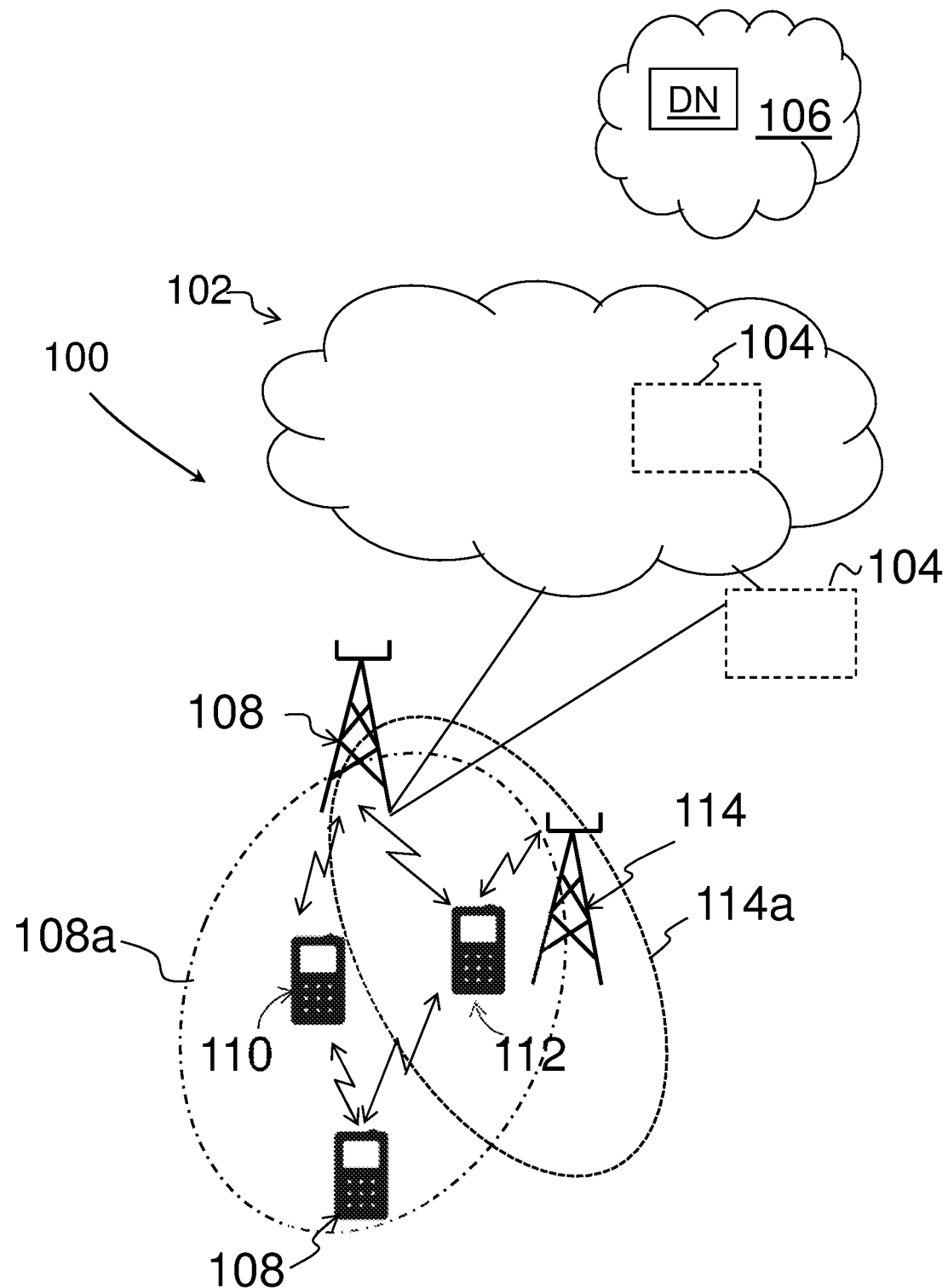
FIG. 16 schematically illustrates embodiments of a wireless communications system.

Embodiments herein relate to wireless communication networks in general. FIG. 16 is a schematic overview depicting a wireless communications network 100 in which embodiments herein may be implemented. The radio communications network 100 comprises one or more Radio Access Networks (RANs) and one or more Core Networks (CNs) 102 comprising a core network node 104. The core network node 104 may be an MME which is a control node for an LTE access network, a Serving Gateway (SGW), or a Packet Data Network Gateway (PGW). The MME is amongst other responsible for tracking and paging procedure including retransmissions.

The wireless communications network 100 may use a number of different technologies, such as NB-IoT, Bluetooth, CAT-M, Wi-Fi, eMTC, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

A transmitter 108, herein sometimes also referred to as a wireless transmitter or a transmitting node, operates in the radio communications network 100. The transmitter 108 is a network node providing radio coverage over a geographical area, a service area 108a. The service area 108a which may also be referred to as a cell, a beam or a beam group of a first Radio Access Technology (RAT), such as 5G, LTE, Wi-Fi, NB-IoT, CAT-M, Wi-Fi, eMTC, Bluetooth or similar. The transmitter 108 may be a transmission and reception point, i.e. a network node such as a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the transmitter 108 depending e.g. on the radio access technology and terminology used. The AP STA may be a wireless device/node such as a user node e.g. user equipment acting as an access point and communicating in downlink with one or more receivers, e.g. receivers 110,112. Thus, the transmitter 108 may be referred to as an AP STA. Further, the transmitter 108 may be referred to as a serving radio network node and communicates with one or more receivers, e.g. receivers 110,112, with Downlink (DL) transmissions to the receivers and Uplink (UL) transmissions from the receivers.

In the wireless communication network 100, a wideband receiver 110 and a narrowband receiver 112 are operating. The wideband receiver 110 and the narrowband receiver 112 may also be referred to as wideband receiving node 110 and a narrowband receiving node 112, respectively. The receivers 110, 112 may be wireless devices operating in the wireless communications network 100. As schematically illustrated in FIG. 16, the receiver 110,112 may communicate with a network node, e.g. the transmitter 108 and/or the network node 114, which will be described in more detail below.

The receivers 110, 112 may each a wireless device e.g. a mobile station, a non-access point (non-AP) STA, a STA, a user equipment and/or a wireless terminals, an NB-IoT device, an eMTC device and a CAT-M device, a WiFi device, an LTE device and an NR device communicate via one or more Access Networks (AN), e.g. RAN, to one or more Core Networks (CN). It should be understood by the skilled in the art that "wireless device" is a non-limiting term which means any terminal, wireless communication terminal, user equipment, Device to Device (D2D) terminal, or node e.g. smart phone, laptop, mobile phone, sensor, relay, mobile tablets or even a small base station communicating within a cell.

In some of the embodiments described herein the non-limiting term UE is used and it refers to any type of device communicating with a network node in a wireless communications network, e.g. the communications network 100. Examples of wireless devices or UEs are stations (STAs), target devices, device to device UEs, machine type UEs or UEs capable of machine to machine communication, Personal Digital Assistants (PDA), iPADs, Tablets, mobile terminals, smart phones, Laptop Embedded Equipped (LEE), Laptop Mounted Equipment (LME), USB dongles etc. In this disclosure the terms wireless device and UE are used interchangeably. Further, it should be noted that the term user equipment used in this disclosure also covers other wireless communications devices such as Machine Type of Communication (MTC) device, an Internet of Things (IoT) device, e.g. a Cellular IoT (CIoT) device. Please note the term user equipment used in this document also covers other wireless communications devices such as Machine to Machine (M2M) devices, even though they do not have any user.

Further network nodes, such as a network node 114, may operate in the radio communications network 100. The network node 114 may be an Access Node (AN), e.g. a wireless access node, such as a WLAN access node, an LRWPAN access node, a radio access node or any node capable of transmitting data to a receiving node. The AN may be referred to as an Access Point (AP), and the terms AN and AP may be used interchangeably.

Embodiments disclosed herein may comprise a Distributed Node (DN) and functionality, e.g. comprised in a cloud 106 as shown in FIG. 16, which may be used for performing or partly performing the methods.

Example embodiments of a flowchart depicting embodiments of a method performed by the transmitter 108, e.g. for transmitting overlaid and underlaid signals to the narrowband receiver 112 and the wideband receiver 110, respectively is depicted in FIGS. 15A and 15B and will be described more in detail in the following. As previously mentioned, the transmitter 108 and the narrowband and wideband receivers 112,110 operate in the wireless communications network 100. As also previously mentioned, the transmitter 108 may be an AP, e.g. an AP STA, or a base station. The transmitter 108 when being an AP STA may sometimes in this disclosure be referred to as a wireless device/node or user node. The method may comprise one or more of the following actions which actions may be taken in any suitable order. Further, it should be understood that one or more actions may be optional and that actions may be combined.

Action 200

The transmitter 108 may receive data to be transmitted to the narrowband receiver 112 and the wideband receiver 110, respectively. The data may be received from a network node, e.g. the core network node 104.

Action 201

The transmitter 108 generates a narrowband signal which carries data for transmission to the narrowband receiver 112. In other words, the transmitter 108 generates a narrowband signal that is associated with data for transmission to the narrowband receiver 112. Thus, the transmitter 108 generates a signal decodable by the narrowband receiver 112 and which signal carries the data to be transmitted to the narrowband receiver 112.

The transmitter 108 generates the narrowband signal by mapping user code bits of the data to a first set of binary symbols; by generating a second set of binary symbols by precoding the first set of binary symbols; by rotating the binary symbols of the second set by 90 degrees resulting in rotated constellation symbols; and by filtering the rotated constellation symbols by means of a pulse shaping filter.

In some embodiments, the precoding of the first set of binary symbols comprises that the transmitter 108 performs a cumulative product on the first set of binary symbols.

The transmitter 108 may generate the narrowband signal and the wideband signal such that an eye diagram of the generated narrowband signal has a larger eye opening than an eye diagram of a GFSK modulated signal with a modulation index $h=\frac{1}{2}$, and such that the generated narrowband signal has an average power and a baud rate which are the same as an average power and a baud rate of a GFSK signal with a modulation index $h=\frac{1}{2}$. Thereby, the generated narrowband signal will be successfully received by the NB receiver 112 configured to receive a GFSK modulated signal with a modulation index $h=\frac{1}{2}$.

In some embodiments, the spectral characteristics of the generated narrowband signal are dependent on an MCS used in the generation of the wideband signal. Further, the spectral characteristics of the generated narrowband signal may comprise one or more spectrum mask requirements that are dependent on the used MCS.

By means of the pulse shaping filter, the transmitter 108 may control spectral leakage of the generated narrowband signal into the generated wideband signal in order to guarantee a minimum required Signal-to-Interference plus Noise Ratio, SINR, to the underlaid wideband signal. The minimum required SINR may vary with the MCS used in the generation of the wideband signal.

In some embodiments, the filtering of the rotated constellation symbols by means of the pulse shaping filter creates a narrowband signal having a wider eye opening than a signal generated by a Gaussian Frequency Shift Keying, GFSK, with modulation index $h=\frac{1}{2}$ and with the same average power and the same baud rate of a single carrier narrowband signal, whereby the wider eye opening causes a reduction in inter-symbol interference as compared to the signal generated by the GFSK signal but without increasing interference with the underlaid wideband signal as compared to the signal generated by the GFSK.

Action 202

The transmitter 108 generates a wideband signal, which wideband signal carries data for transmission to the wideband receiver 110. In other words, the transmitter 108 generates a wideband signal that is associated with data for transmission to the wideband receiver 110.

In some embodiments, the transmitter 108 generates the wideband signal using OFDM.

Action 203

In order to efficiently utilize the radio spectrum and to enable concurrent operation of the wideband receiver 110 and the narrowband receiver 112, the transmitter 108 overlays the generated narrowband signal over the generated wideband signal. By the expression "overlay a first signal over a second signal" is meant that a non-orthogonal multiple access technique is used to combine the first and second signals. For example, a non-orthogonal multiplexing of the first and second signals may be performed to overlay the first signal over the second signal. The generated narrowband signal is sometimes in this disclosure referred to as an overlaid narrowband signal and the generated wideband signal is sometimes in this disclosure referred to as an underlaid wideband signal.

Action 204

The transmitter 108 transmits, to the narrowband receiver 112 and the wideband receiver 110, the overlaid narrowband signal and the underlaid wideband signal, respectively. Thereby, the narrowband receiver 112 and the wideband receiver 110 will be able to receive and decode the respective signal transmitted to them and the radio spectrum is efficiently used while at the same time enable concurrent operation of the wideband receiver 110 and the narrowband receiver 112.

Figure 17:
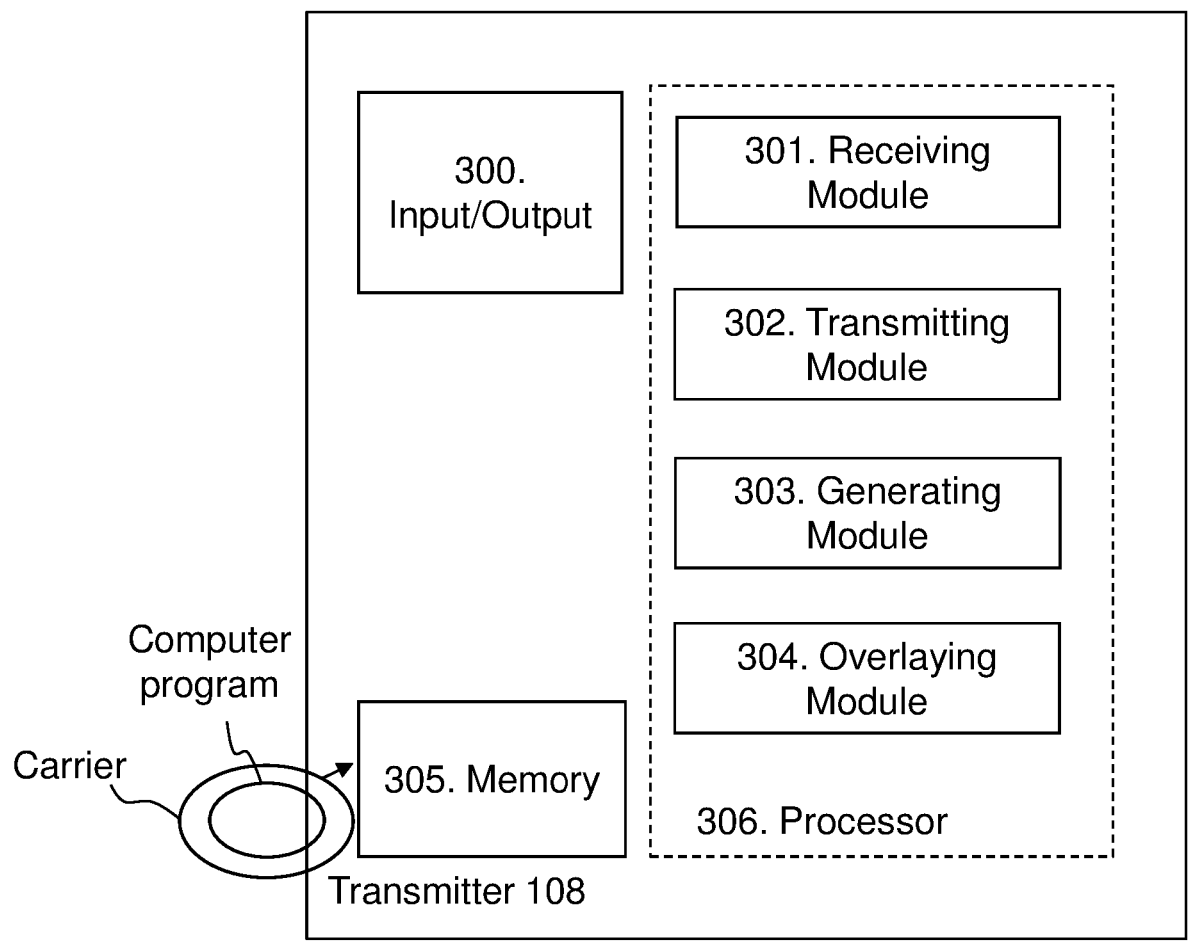
FIG. 17 is a schematic block diagram illustrating embodiments of a transmitter.

To perform the method for transmitting overlaid and underlaid signals to the narrowband receiver 112 and the wideband receiver 110, the transmitter 108 may be configured according to an arrangement depicted in FIG. 17. As previously mentioned, the transmitter 108 and the narrowband and wideband receivers 112,110 are configured operate in the wireless communications network 100. As also previously mentioned, the transmitter 108 may be an AP, e.g. an AP STA, or a base station. The transmitter 108 when being an AP STA may sometimes in this disclosure be referred to as a wireless device/node or user node.

The transmitter 108 comprises an input and output interface 300 configured to communicate in the wireless communications network 100, e.g. with one or more network nodes, such as network node 104. and/or with one or more receivers, such as the receivers 110,112. The input and output interface 200 may comprise a wireless receiver (not shown) and a wireless transmitter (not shown).

The transmitter 108 is configured to receive, e.g. by means of a receiving module 301 configured to receive, a transmission, e.g. data, from one or more nodes operating in the wireless communications network 100. The data may be data to be transmitted to the narrowband receiver 112 and the wideband receiver 110. The receiving module 301 may be implemented by or arranged in communication with a processor 306 of the transmitter 108. The processor 306 will be described in more detail below.

The transmitter 108 is configured to transmit, e.g. by means of a transmitting module 302 configured to transmit, a NB signal to a NB receiver 112 and a WB signal to a WB receiver 114. The transmitting module 302 may be implemented by or arranged in communication with the processor 306 of the transmitter 108.

Thus, the transmitter 108 is configured to transmit, to the narrowband receiver 112 and the wideband receiver 110, the overlaid narrowband signal and the underlaid wideband signal, respectively.

The transmitter 108 is configured to generate, e.g. by means of a generating module 303 configured to generate, a NB signal and a WB signal. The generating module 303 may be implemented by or arranged in communication with the processor 306 of the transmitter 108.

The transmitter 108 is configured to generate a narrowband signal which narrowband signal carries data for transmission to the narrowband receiver 112. In other words, the transmitter 108 is configured to generate a narrowband signal that is associated with data for transmission to the narrowband receiver 112. Further, the transmitter 108 is configured to generate the narrowband signal by being configured to map user code bits of the data to a first set of binary symbols; generate a second set of binary symbols by precoding the first set of binary symbols; rotate the binary symbols of the second set by 90 degrees resulting in rotated constellation symbols; and filter the rotated constellation symbols by means of a pulse shaping filter.

In some embodiments, the transmitter 108 is configured to perform the precoding of the first set of binary symbols by being configured to perform a cumulative product on the first set of binary symbols.

The transmitter 108 may be configured to generate the narrowband signal such that an eye diagram of the generated narrowband signal has a larger eye opening than an eye diagram of a GFSK modulated signal with a modulation index h=½, and such that the generated narrowband signal has an average power and a baud rate which are the same as an average power and a baud rate of a GFSK signal with a modulation index h=½.

The filtering of the rotated constellation symbols by means of the pulse shaping filter creates a narrowband signal having a larger eye opening than a signal generated by a GFSK, with modulation index h=½ and with the same average power and the same baud rate as the narrowband signal. The larger eye opening implies a reduction in inter-symbol interference as compared to the signal generated by the GFSK modulator but without increasing interference with the underlaid wideband signal as compared to the signal generated by the GFSK modulator.

Further, the transmitter 108 is configured to generate a wideband signal, which wideband signal carries data for transmission to the wideband receiver 110. In other words, the transmitter 108 is configured to generate a wideband signal that is associated with data for transmission to the wideband receiver 110.

In some embodiments, the transmitter 108 is configured to generate the wideband signal by being configured to generate the wideband signal using an OFDM.

In some embodiments, the transmitter 108 is configured to generate the narrowband signal such that spectral characteristics of the generated narrowband signal are dependent on a MCS used by the transmitter 108 when generating the wideband signal, and such that the spectral characteristics of the generated narrowband signal comprises one or more spectrum mask requirements that are dependent on the used MCS.

The transmitter 108 may be configured to control, by means of the pulse shaping filter, spectral leakage of the generated narrowband signal into the generated wideband signal in order to guarantee a minimum required SINR to the underlaid wideband signal. It should be understood that the minimum required SINR may vary with the MCS used when generating the wideband signal.

The transmitter 108 is configured to overlay, e.g. by means of an overlaying module 304 configured to overlay, a NB signal over a WB signal. The overlaying module 304 may be implemented by or arranged in communication with the processor 306 of the transmitter 108.

The transmitter 108 is configured to overlay the generated narrowband signal over the generated wideband signal. The generated narrowband signal is sometimes in this disclosure referred to as an overlaid narrowband signal and the generated wideband signal is sometimes in this disclosure referred to as an underlaid narrowband signal.

The transmitter 108 may also comprise means for storing data. In some embodiments, the transmitter 108 comprises a memory 305 configured to store the data. The data may be processed or non-processed data and/or information relating thereto. The memory 305 may comprise one or more memory units. Further, the memory 305 may be a computer data storage or a semiconductor memory such as a computer memory, a read-only memory, a volatile memory or a non-volatile memory. The memory 305 is arranged to be used to store obtained information, data, configurations, scheduling algorithms, and applications etc. to perform the methods herein when being executed in the memory 305.

Embodiments herein for for transmitting overlaid and underlaid signals to the narrowband receiver 112 and the wideband receiving node 110 may be implemented through one or more processors, such as the processor 306 in the arrangement depicted in FIG. 17, together with computer program code for performing the functions and/or method actions of embodiments herein. The program code mentioned above may also be provided as a computer program product, for instance in the form of a data carrier carrying computer program code for performing the embodiments herein when being loaded into the transmitter 108. One such carrier may be in the form of an electronic signal, an optical signal, a radio signal or a computer readable storage medium. The computer readable storage medium may be a CD ROM disc or a memory stick. The computer program code may furthermore be provided as program code stored on a server and downloaded to the transmitter 108.

Those skilled in the art will also appreciate that the input/output interface 300, the receiving module 301, the transmitting module 302, the generating module 303, and the overlaying module 304 above may refer to a combination of analog and digital circuits, and/or one or more processors configured with software and/or firmware, e.g. stored in the memory 305, that when executed by the one or more processors such as the processors in the transmitter 108 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

EXEMPLARY ENUMERATED EMBODIMENTS

Embodiment 1

A method as exemplified in FIG. 15 and implemented in a wireless node/device, e.g. in an AP STA being the transmitter 108, to multiplex users in the frequency domain by means of an overlay/underlay non-orthogonal multi-user multiplexing scheme, where one or more narrowband waveforms (intended for a first group of users, e.g. the NB receiver 112) are overlaid over one or more wideband waveforms (intended for a second group of users, e.g. the WB receiver 110) and where The transmitter, e.g. the transmitter 108, is optionally configured to Receive data for transmission to at least one narrowband user, e.g. the NB receiver 112, and at least one wideband user, e.g. the WB receiver 110. This relates to Action 200 previously described.

Generate narrowband waveforms. This relates to Action 201 previously described. The waveforms associated with the transmissions of data information from the wireless node, e.g. the transmitter 108, to a first set of remote nodes, e.g. the NB receiver 112, having all or at least one of the following properties:

The narrowband waveforms may be successfully received and decoded by receivers, e.g. the NB receiver 112, configured to receive GFSK, modulation index h=½, waveforms.

The eye diagram of said narrowband waveforms has a larger eye opening than the eye diagram of a GFSK signal with modulation index h=½, and with the same average power and the same baud rate as the single carrier narrowband signal.

Overlay the narrowband waveforms over the wideband waveforms, which wideband waveforms have been generated by the transmitter, e.g. the transmitter 108, using OFDM. This relates to Action 202 previously described.

Transmit simultaneously the overlaid narrowband waveforms and the underlaid wideband waveforms to the respective receiver, e.g. to the NB receiver 112 and the WB receiver 110, respectively. This relates to Actions 203 and 204 previously described.

Embodiment 2

As in embodiment 1, where the spectral characteristics of the narrowband waveforms are dependent on the MCS used in the WB waveforms. In particular, the spectral leakage of a NB signal into the WB signals is controlled by the transmitter in order to guarantee a minimum SNR to the underlaid WB signals, and this minimum SNR may vary according to the MCS.

Embodiment 3

The transmitter, e.g. the transmitter 108, comprises means, such as a processor, to generate a narrowband waveform comprising
an encoder, such as a cumulative product encoder, a cumulative sum encoder, or a differential encoder,
a rotation unit and
a pulse shaping filter Embodiment 4

As in embodiment 3, where the bandwidth and spectral characteristics of the pulse shaping filter are dependent on the SNR requirements of the underlaid WB signal.

Embodiment 5

As in embodiment 3 or 4, where the pulse shaping filter has one or more zeros at frequencies that coincide with the center of frequency of one or more active subcarriers employed in the generation the underlaid WB signals.

Embodiments disclosed herein are related to an apparatus to realize the embodiments in practice as exemplified by FIG. 13 for a wireless node/device or user node e.g. in an AP STA being the transmitter 108. The apparatus is adapted to perform some or all of the different method steps outlined above. The apparatus describes a wireless node/device, e.g. the AP STA being the transmitter 108, arranged with radio circuitry to communicate with radio network nodes or other wireless nodes, memory to store information related to the invention, and a processing unit.

The radio circuit comprises a transmitting module which is configured to perform the steps described above in the different embodiments.

The memory is configured to store information related to embodiments described herein.

The invention is related to a transmitter, e.g. the transmitter 108, to realize the embodiments in practice as exemplified by FIG. 14 of means, such as a processor, to generate a narrowband waveform. In the main steps of the exemplary embodiments described, the transmitter, e.g. the transmitter 108, describes a processor, arranged with an encoder, a pulse shaping filter and a rotation unit.

ABBREVIATIONS

| Abbreviation | Explanation |
|---|---|
| ACK | Acknowledgment |
| AP | Access Point |
| AWGN | Additive White Gaussian Noise |
| BSS | Basic Service Set |
| CP | Cyclic Prefix |
| DL | Downlink |
| EVM | Error Vector Magnitude |
| FFT | Fast Fourier Transform |
| FSK | Frequency Shift Keying |
| GFSK | Gaussian Frequency Shift Keying |
| IFFT | Inverse Fast Fourier Transform |
| MCS | Modulation and Coding Scheme |
| NO-GFSK | Nearly Orthogonal GFSK |
| OBSS | Overlapping BSS |
| OFDM | Orthogonal Frequency Division Multiplexing |
| OFDMA | Orthogonal Frequency Division Multiple Access |
| PHY | Physical Layer |
| RU | Resource Unit |
| STA | Station |
| TDD | Time Division Duplex |
| UL | Uplink |
| WLAN | Wireless Local Area Network |

When the word "comprise" or "comprising" is used in this disclosure it shall be interpreted as non-limiting, i.e. meaning "consist at least of".

Modifications and other variants of the described embodiment(s) will come to mind to one skilled in the art having the benefit of teachings presented in the foregoing descriptions and the associated drawings. Therefore, it is to be understood that the embodiment(s) herein is/are not be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method performed by a transmitter for transmitting overlaid and underlaid signals to a narrowband receiver and a wideband receiver respectively, wherein the transmitter and the narrowband and wideband receivers operate in a wireless communications network, and wherein the method comprises:
generating a narrowband signal that carries first data for transmission to the narrowband receiver, wherein the narrowband signal is generated based on:
mapping user code bits of the first data to a first set of binary symbols;
generating a second set of binary symbols by precoding the first set of binary symbols;
rotating the binary symbols of the second set by 90 degrees resulting in rotated constellation symbols; and
filtering the rotated constellation symbols by a pulse shaping filter;
generating a wideband signal that carries second data for transmission to the wideband receiver;
overlaying the generated narrowband signal over the generated wideband signal, such that the generated narrowband signal is an overlaid narrowband signal and the generated wideband signal is an underlaid wideband signal; and transmitting, to the narrowband receiver and the wideband receiver, the overlaid narrowband signal and the underlaid wideband signal, respectively.

2. The method of claim 1, wherein the precoding of the first set of binary symbols comprises performing a cumulative product on the first set of binary symbols.

3. The method of claim 1, wherein:

the narrowband signal is generated such that an eye diagram, of the generated narrowband signal, has a larger eye opening than an eye diagram of a Gaussian Frequency Shift Keying (GFSK) signal with a modulation index h=1/2; and the narrowband signal is generated such that it has an average power and a baud rate which are the same as an average power and a baud rate of the GFSK signal with the modulation index h=1/2.

4. The method of claim 1, wherein the wideband signal is generated utilizing an Orthogonal Frequency Division Modulation (OFDM).

5. The method of claim 1, wherein:

the narrowband signal is generated such that its spectral characteristics are dependent on a Modulation and Coding Scheme (MCS) utilized in the generating of the wideband signal; and the narrowband signal is generated such that its spectral characteristics comprise one or more spectrum mask requirements that are dependent on the utilized MCS.

6. The method of claim 5, wherein filtering the rotated constellation symbols by the pulse shaping filter comprises controlling spectral leakage of the generated narrowband signal into the generated wideband signal in order to guarantee a minimum required Signal-to-Interference plus Noise Ratio (SINR) to the underlaid wideband signal, wherein said minimum SINR is related to the MCS utilized in the generated wideband signal.

7. The method of claim 1, wherein filtering the rotated constellation symbols by the pulse shaping filter generates an other narrowband signal having a larger eye opening than a signal generated by a Gaussian Frequency Shift Keying, GFSK, modulator with a modulation index h=1/2 and with the same average power and the same baud rate as the narrowband signal, whereby the larger eye opening indicates a reduction in inter-symbol interference as compared to the signal generated by the GFSK modulator but without increasing interference with the underlaid wideband signal as compared to the signal generated by the GFSK modulator.

8. A non-transitory, computer-readable medium storing computer-executable program instructions that, when executed on at least one processor comprising a wireless transmitter, configures the wireless transmitter to perform operations corresponding to the method of claim 1.

9. A transmitter for transmitting overlaid and underlaid signals to a narrowband receiver and a wideband receiver respectively, wherein the transmitter and the narrowband and wideband receivers are configured to operate in a wireless communications network, and wherein the transmitter comprises:

at least one processor; and a computer memory storing executable instructions that, when executed by the at least one processor, configure the transmitter to:

generate a narrowband signal that carries first data for transmission to the narrowband receiver, wherein the narrowband signal is generated based on:

mapping user code bits of the first data to a first set of binary symbols;

generating a second set of binary symbols by precoding the first set of binary symbols;

rotating the binary symbols of the second set by 90 degrees resulting in rotated constellation symbols; and filtering the rotated constellation symbols by means of a pulse shaping filter;

generate a wideband signal that carries second data for transmission to the wideband receiver;

overlay the generated narrowband signal over the generated wideband signal, such that the generated narrowband signal is an overlaid narrowband signal and the generated wideband signal is an underlaid wideband signal; and transmit, to the narrowband receiver and the wideband receiver, the overlaid narrowband signal and the underlaid wideband signal, respectively.

10. The transmitter of claim 9, wherein the transmitter is configured to perform the precoding of the first set of binary symbols by being configured to perform a cumulative product on the first set of binary symbols.

11. The transmitter of claim 9, wherein:

the narrowband signal is generated such that an eye diagram, of the generated narrowband signal, has a larger eye opening than an eye diagram of a Gaussian Frequency Shift Keying (GFSK) signal with a modulation index h=1/2; and the narrowband signal is generated such that it has an average power and a baud rate which are the same as an average power and a baud rate of the GFSK signal with the modulation index h=1/2.

12. The transmitter of claim 9, wherein execution of the instructions configures the transmitter to generate the wideband signal using utilizing Orthogonal Frequency Division Modulation (OFDM).

13. The transmitter of claim 9, wherein execution of the instructions configures the transmitter to generate the narrowband signal such that:

its spectral characteristics are dependent on a Modulation and Coding Scheme (MCS) utilized in the generating of the wideband signal; and its spectral characteristics comprise one or more spectrum mask requirements that are dependent on the utilized MCS.

14. The transmitter of claim 13, wherein execution of the instructions configures the transmitter to filter the rotated constellation symbols by the pulse shaping filter based on controlling spectral leakage of the generated narrowband signal into the generated wideband signal in order to guarantee a minimum required Signal-to-Interference plus Noise Ratio (SINR) to the underlaid wideband signal, wherein said minimum SINR is related to the MCS utilized in the generated wideband signal.

15. The transmitter of claim 9, wherein execution of the instructions configures the transmitter to filter the rotated constellation symbols by the pulse shaping filter to generate an other narrowband signal having a larger eye opening than a signal generated by a Gaussian Frequency Shift Keying (GFSK), modulator with a modulation index h=1/2 and with the same average power and the same baud rate as the GFSK signal, whereby the larger eye opening causes a reduction in inter-symbol interference as compared to the signal generated by the GFSK modulator but without increasing interference with the underlaid wideband signal as compared to the signal generated by the GFSK modulator.

* * * * *